United States Patent
Gzybowski

(10) Patent No.: US 11,478,110 B2
(45) Date of Patent: Oct. 25, 2022

(54) CURVED CUTTING BOARD AND HOLDER

(71) Applicant: Michael S. Gzybowski, Ann Arbor, MI (US)

(72) Inventor: Michael S. Gzybowski, Ann Arbor, MI (US)

(*) Notice: Subject to any disclaimer, the term of this patent is extended or adjusted under 35 U.S.C. 154(b) by 0 days.

(21) Appl. No.: 17/561,444

(22) Filed: Dec. 23, 2021

(65) Prior Publication Data

US 2022/0167798 A1    Jun. 2, 2022

Related U.S. Application Data

(63) Continuation-in-part of application No. 17/105,911, filed on Nov. 27, 2020, now Pat. No. 11,304,568.

(60) Provisional application No. 62/942,091, filed on Nov. 30, 2019, provisional application No. 62/952,231, filed on Dec. 21, 2019.

(51) Int. Cl.
 *A47J 47/00* (2006.01)
 *A47J 47/16* (2006.01)
(52) U.S. Cl.
 CPC ............ *A47J 47/005* (2013.01); *A47J 47/16* (2013.01)
(58) Field of Classification Search
 CPC .................................. A47J 47/005; A47J 47/16
 See application file for complete search history.

(56) References Cited

U.S. PATENT DOCUMENTS

| | | | |
|---|---|---|---|
| 5,203,548 A * | 4/1993 | Sanders | A47J 47/005 269/302.1 |
| 9,750,374 B1 * | 9/2017 | Norton | A47J 47/005 |
| 10,213,055 B1 * | 2/2019 | Randall | A47J 47/005 |
| 2006/0208410 A1 * | 9/2006 | McRorie, III | A47J 47/005 269/289 R |
| 2020/0047325 A1 * | 2/2020 | Wei | A47B 21/03 |

FOREIGN PATENT DOCUMENTS

DE          10060723 A1 *   6/2002   ............ A47J 47/005

OTHER PUBLICATIONS

Machine Translation of "Convertible chopping board, comprising lifting mechanism for lateral areas for safe transfer of chopped food into container" by Memmesheimer Guenter and Luellau Claudia. (Year: 2002).*

* cited by examiner

*Primary Examiner* — Nirvana Deonauth

(57) ABSTRACT

A method of chopping or cutting a food item on a cutting board which involves configuring and holding a flexible cutting board in a U-shaped configuration and chopping or cutting a food item in the bottom of the U-shaped configuration. Particles of the food item that would otherwise traject off a flat cutting board are contained between the side walls of the U-shaped configuration of the flexible cutting board and un-chopped and un-cut pieces of the food item fall downward into the bottom of the U-shaped configuration of the flexible cutting board. Also provided is the combination of a flexible cutting board and a cutting board holder that receives and holds a flexible cutting board in the U-shaped configuration.

13 Claims, 5 Drawing Sheets

CURVED CUTTING BOARD AND HOLDER

RELATED APPLICATIONS

The present application is a continuation-in-part application of U.S. Non-Provisional patent application Ser. No. 17/105,911, filed Nov. 27, 2020 which in turn is based on U.S. Provisional Application Ser. No. 62/942,091, filed Nov. 30, 2019 and U.S. Provisional Application Ser. No. 62/952,231, filed Dec. 21, 2019, to all of which priority is claimed under 35 U.S.C. § 120 and of each of which the entire disclosure is hereby expressly incorporated by reference.

BACKGROUND

The present invention relates generally to cutting boards that are used to chop and cut foods and more particularly to a cutting board that is used in a curved configuration when cutting or chopping foods so as to provide more efficient food processing.

Cutting boards are used by chiefs and other cooks to chop and cut different foods, seasonings and other recipe ingredients. Wooden cutting boards are perhaps the most common types of cutting boards that have been used for ages. More recently plastic cutting boards have become popular, often because people believe that, because they are non-porous, they are more sanitary and easier to clean and maintain.

While chopping or cutting soft foods like celery, onions, peppers, garlic, etc. is relatively straight forward and easy to do on a cutting board, some harder foods are brittle and can become more difficult to chop or cut.

Brittle foods such as nuts, hard candies, hard solid spices, etc. often have to be reduced in size for different recipes and may have to be significantly reduced in size in some instance, for example when used as or in, breading. Brittle by definition means "hard but liable to break or shatter easily." As used herein "brittle food" refers to a hard food that is liable to break or shatter easily when chopped, with chopped pieces absorbing kinetic energy and trajecting when chopped. Reference herein to "food," "foods," food item," and "food items" are meant to similarly refer to recipe ingredients that are chopped and/or cut for use.

Nuts can be chopped in a food processors and electrical and mechanical/manual choppers. However, getting out, using and then cleaning such equipment for one ingredient in a recipe can be a lot of extra time consuming work. In the case chopping nuts, their moisture and oil content can cause finely chopped particles to stick and accumulate in/on equipment, resulting in difficult cleaning and ingredient loss.

Flexible cutting boards have been developed for purposes of chopping and/or cutting food items and allowing for pouring chopped and cut ingredients into various containers. In use, these cutting boards are laid out flat on a surface such as a kitchen counter top, the desired foods are chopped or cut, and then the flexible cutting boards can be bent to form a chute through or along which the chopped or cut food products can be poured into a mixing bowl or other type of container.

The present inventor has discovered that chopping nuts or other brittle food items on a flat cutting board results in chopped pieces scattering and flying off cutting board due to impact forces. In addition, chopped pieces that remain on the cutting board are mixed with un-chopped pieces and must be physically pushed together to make chopping by hand with a knife effective.

After attempting to crush nuts with a meat hammer, and grind nuts in a mortar and pestle and discovering these attempts were unsuccessful, the present inventor fashioned a flexible cutting board into a shape that both prevented chopped particles from deflecting and dispersing, and that caused un-chopped and not fully chopped particles to collect into an area where they are subject to chopping with a knife.

The present invention provides a flexible cutting board that is used in a curved configuration when cutting or chopping foods so as to provide more efficient food processing. Further the present invention provides a cutting board that can be used in combination with a cutting board holder that secures the cutting board in a curved configuration.

BRIEF SUMMARY

According to various features, characteristics and embodiments of the present invention which will become apparent as the description thereof proceeds, the present invention provides a method of chopping or cutting food items on a cutting board which method comprises the steps of:
  a) providing a flexible cutting board having opposed sides and opposed ends;
  b) configuring and holding the flexible cutting board in a U-shaped configuration;
  c) placing a food item to be chopped or cut in a bottom of the U-shaped configured flexible cutting board;
  d) resting the bottom of the U-shaped configured flexible cutting board on a solid surface; and
  e) chopping or cutting the food item placed in the U-shaped configured flexible cutting board.

The present invention further provides the combination of a flexible cutting board and a cutting board holder which comprises:
  a cutting board holder comprising a base and structures that extend upward from the base; and
  a flexible cutting board having opposed sides and opposed ends,
  wherein when the flexible cutting board is positioned in the cutting board holder, the cutting board conforms into a U-shaped configuration with side walls that are adjacent the structures that extend upward from the base of the cutting board holder and a bottom that rests on the base of the cutting board holder.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

As noted above, the present invention provides a flexible cutting board that is used in a curved configuration when cutting or chopping foods so as to provide more efficient food processing. Further the present invention provides a cutting board that can be used in combination with a cutting board holder that secures the cutting board in a curved configuration.

The flexible cutting board used in the present invention can be made of a polyethylene or polypropylene material such as amorphous polypropylene co-polymer (alternatively known as 1-propene, polymer with ethane) or high density polyethylene or any suitable semi-rigid plastic or elastomeric material that can withstand being punctured by a knife when chopping or cutting food items and is flexible for purposes of the present invention. Here it is noted that, as readily understood by those in the art, the flexibility of the cutting boards useful for purposes of the present invention can be adjusted by appropriately sizing the thicknesses of the cutting boards and choice of materials from which the flexible cutting boards are made. Commercially available flexible cutting boards can be used in accordance with the present invention.

According to one embodiment of the present invention, a method of using the flexible cutting boards involves physically or manually holding the flexible cutting boards in a curved configuration while chopping or cutting foods on/in the flexible cutting boards. Here reference to cutting foods "on/in" the flexible cutting boards will be understood as the description of the present invention proceeds, and it is apparent that while the foods are chopped or cut "on" the flexible cutting boards at the bottom of the curved configuration, the foods being chopped or cut are located between or "in" the side walls of the curved configuration of the flexible cutting boards. As can be understood, according to the present invention the height of the side walls of the cutting board are sufficient to "catch" and retain food particles that traject outwardly from the sides of the knife blade.

According to another embodiment of the present invention the flexible cutting boards of the present invention are used in combination with a cutting board holder that is configured to receive the flexible cutting boards in a curved configuration and hold the cutting boards in such curved configuration in a manner that frees both hands of the person using the flexible cutting boards to chop or cut foods.

In all embodiments of the present invention, the flexible cutting boards can be used in normal or laid out flat configurations and can be held in a curved configuration to form and used as a chute to pour chopped or cut food items into bowels, containers, etc.

Figure 1:
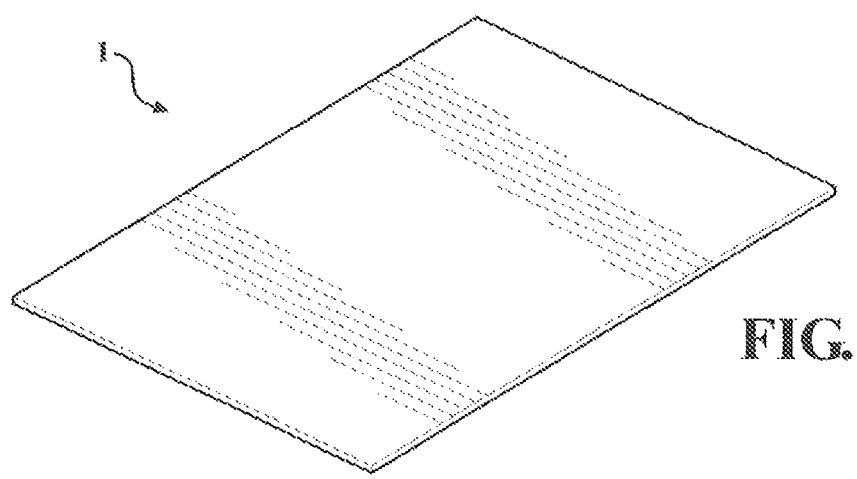
FIG. 1 is a perspective view of a flexible board according to the present invention laid out in a flat configuration.

FIG. 1 is a perspective view of a flexible board according to the present invention laid out in a flat configuration. The flexible cutting board 1 shown in FIG. 1 has a rectangular shape and can be of any convenient size such as, but not limited to 15×12 inches, 18×12 inches, 24×18 inches, etc. Larger and smaller sizes can also be provided and used. As noted above the flexible cutting board 1 can be made of a polyethylene or polypropylene material such as amorphous polypropylene co-polymer (alternatively known as 1-propene, polymer with ethane) or high density polyethylene or any suitable flexible or semi-rigid plastic or elastomeric material that can withstand being punctured by a knife when chopping or cutting food items and is flexible for purposes of the present invention. The thickness of the flexible cutting board 1 can range from 0.03 inches to 0.3 inches or larger. Based on the present description of the invention and how the flexible cutting board 1 is to be held in a curved configuration, those skilled in the art can determine suitable thicknesses of the flexible cutting boards 1 based on the material from which the flexible cutting boards 1 are made.

The upper and lower surfaces of the flexible cutting board 1 can be smooth. Otherwise the lower surface can be provided with a textured surface of the type conventionally used on cutting board to prevent slipping, e.g. a "waffle back." In other embodiments the top surface of the flexible cutting board 1 can be lightly textured as is known in the art of cutting boards to provide a sturdier surface.

Figure 2:
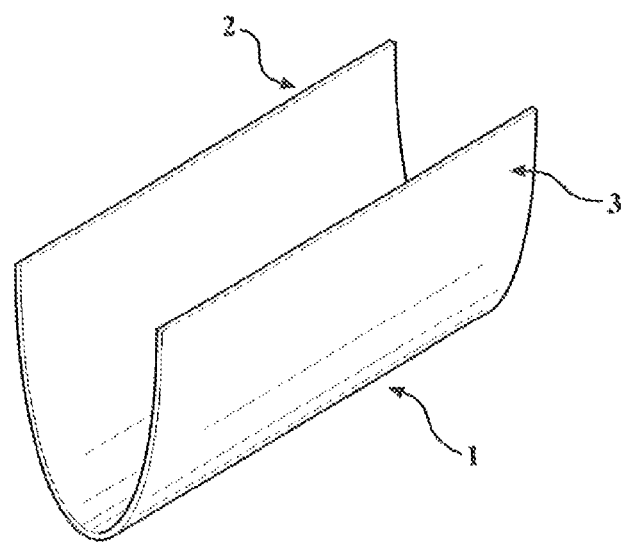
FIG. 2 is a perspective view of the cutting board of FIG. 1 configured in a curved shape according to one embodiment of the present invention.

FIG. 2 is a perspective view of the cutting board of FIG. 1 configured in a curved shape according to one embodiment of the present invention. According to the present invention the flexible cutting board 1 is held in a curved configuration as depicted in FIGS. 2-5 when used during a process of chopping or cutting food items. This curved configuration can be achieved by bending (not creasing) the flexible cutting board 1 of FIG. 1 along or near the center of either the longer or shorter axis so that the corresponding sides 2 and 3 are flexed toward each other with the upper portions of the sides 2 and 3 being parallel or substantially parallel to one another and held so as to face one another with a space in between that is sufficient to allow a used to reach in and chop or cut food items on the flexible cutting board with a knife. In the case of a square cutting board the axes parallel to the opposite sides have the same length. Accordingly, in the case of a square cutting board either pair of opposite side can be bent upward and towards each other.

Figure 3:
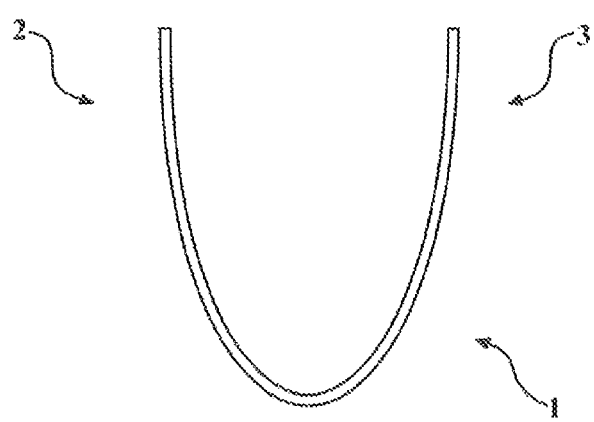
FIG. 3 is an end view of the cutting board of FIG. 2.

FIG. 3 is an end view of the cutting board of FIG. 2. As shown in FIG. 3 the flexible cutting board 1 is in a curved configuration that, from the end view, has the general shape of a "U." As the flexible cutting board 1 is used to chop or cut foods items in such a U-shaped configuration, it was discovered during the course of the present invention that, in the case of chopping brittle food items such as nuts at the bottom of the U-shaped configuration, the upward directed sides 2 and 3 of the U-shaped configuration kept chopped particles from flying out beyond the cutting board 1.

The ability of the U-shaped configuration to prevent particles of chopped food items from flying off and escaping the confines of the curved cutting board is believed to be explained as follows. During a chopping or cutting process, a user aligns a knife along the center of the U-shaped cutting board of FIG. 3 and, maintaining this general alignment, chops downwardly toward the bottom of the U-shaped cutting board. As the blade of the knife pierces brittle food particles such as nuts, the downward force of the blade is transferred into the food particles. This transferred force is applied outwardly from the beveled edge of the blade of the knife. As a result, food particles that are chopped and separated by the knife blade accelerate outwardly from the sides of the knife blade. Since chopped food particles tend to traject outwardly more so than upwardly, the upwardly extending side of the curved cutting board do not have to be extensively tall. A side wall height of about 5 inches or more will "catch" and retain most food particles and a side wall height of about 4 inches will "catch" an retain a significant amount of food particles.

As can be appreciated and likely experienced by many, in the case of chopping brittle food items on a flat cutting board, many chopped particles fly off the cutting board and onto and across a counter where the chopping process is being conducted.

In the case of chopping brittle food items such as nuts in the curved cutting board of the present invention, virtually all chopped particles that might otherwise fly off (as in the case of using a flat cutting board) are contained since the acting forces only cause chopped particles to move in a trajectory outward from the sides of a knife blade and thus toward the upward extending sides 2 and 3 of the U-shaped configuration. Few if any particles will be trajected out from the open ends of the flexible cutting board held in the curved configuration of FIGS. 2-5. Again, due to the manner in which the downward force of the knife is transferred outwardly from the sides of the knife during a chopping/cutting process, food particles do not tend to traject towards the open ends of the curved cutting board.

In addition to containing chopped particles, chopping food items while holding the flexible cutting board in the U-shaped configuration causes un-chopped particles to fall toward the bottom of the U-shaped configuration so that it is not necessary to stop a chopping process and reposition the food items being chopped. This feature of the present invention can be appreciated by considering that when one chops food items such as loose nuts on a flat cutting board, not long into the process it becomes necessary to stop chopping and push un-chopped particles together before continuing chopping. This cycle of chopping, arranging un-chopped particles and resuming chopping is repeated over and over when a flat cutting board is used. This feature of the present invention provides advantages for cutting brittle and soft foods.

In contrast to using a flat cutting board, when performing a chopping or cutting process while holding the flexible cutting board in the U-shaped configuration according to the present invention, un-chopped food particles and pieces automatically fall and collect at the bottom of the U-shaped configuration, relieving the user from having to stop and interrupt the chopping process as in the case of chopping on a flat cutting board. After which the flexible cutting board can be rinsed off and/or wiped off and used to chop or cut another food item.

The U-shaped configuration of the cutting board is not strictly limited to the exact shape illustrated in FIG. 3. Having a configuration with a curved bottom and upward directed sides is desired to contain food items being chopped or cut and allow pieces to be chopped or cut to fall downward and collect or accumulate where they can be efficiently chopped or cut. As can be understood from the description herein, the curved configuration of the cutting board can form a narrower or wider U-shaped configuration than illustrated in FIG. 3. The heights of the sides of the U-shaped configuration are greater than the width of the bottom of the U-shaped configuration. Further the U-shaped configuration does not have to be symmetrical. The upper portions of sides 2 and 3 can be parallel to one another, or substantially parallel to one another or in some embodiments inclined away from one another in the upward direction.

According to one embodiment of the present invention a method of chopping or cutting food items is provided which involves manually holding a flexible cutting board by hand during a chopping and/or cutting process. For example, a right-handed person would hold the top edges of the flexible cutting board upward and slightly together to for a curved configuration as in FIG. 3 with their left hand, and with their right hand the person would hold a knife and chop and/or cut food items within the U-shaped flexible cutting board. After the chopping/cutting the person could hold the flexible cutting board in the same or tighter curved configuration to function as a chute to pour the chopped/cut food item(s) into a container. When not used in a curved configuration, the flexible cutting board could also be used in a conventional flat configuration.

Figure 4:
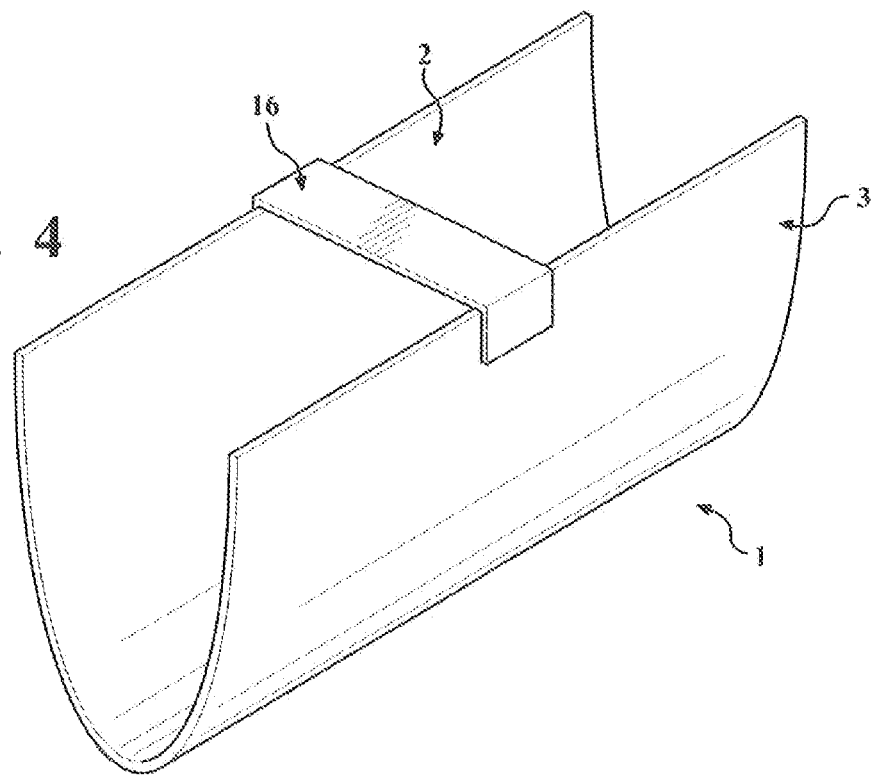
FIG. 4 is perspective view similar to FIG. 2 that depicts a bridging element according to one embodiment of the present invention.
Figure 5:
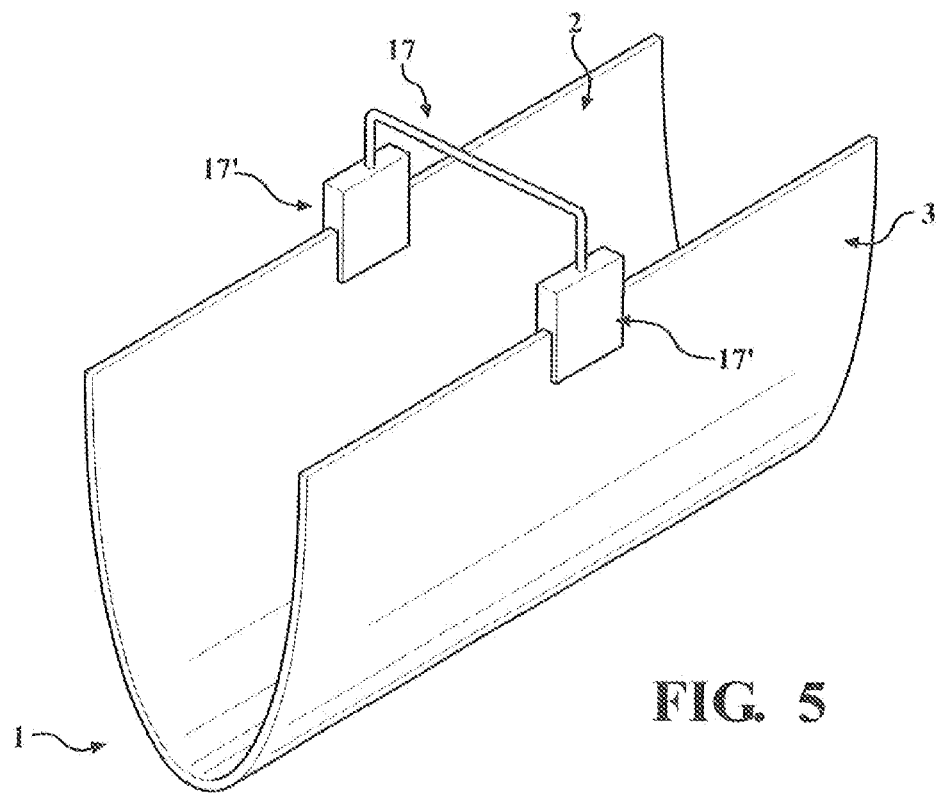
FIG. 5 is a perspective view similar to FIG. 2 that depicts a bridging element according to another embodiment of the present invention.

In alternative embodiments illustrated in FIGS. 4 and 5, the manually holding of the flexible cutting board by hand can involve the use of elements that can removably attach between the tops of opposite sides of the flexible cutting board and hold the tops together in a spaced apart relationship. For example, one or both of the opposite sides of the flexible cutting board could be provided with straps that can be used to removably connect the tops of the opposite sides together to form a U-shaped configuration. Such straps could be connected to the sides and/or each other by snaps, clips or other engaging elements. As an alternative to straps, bridging elements that engage between the top edges of the sides of the flexible cutting board could be used. A bridging element similar to a pleat spacer would provide for engaging the top edges of the sides of the flexible cutting board in a manner that would allow for adjustment of the spacing between the tops of the sides of the flexible cutting board. Alternatively a bridging element 16 (FIG. 4) with only engaging spaces or slots at or near opposite ends (to receive the tops of the opposite sides of the flexible cutting board) could be used to provide a fixed spacing distance between the opposite side walls. Bridging elements 17 (FIG. 5) comprising spaced apart clips 17' could also be used. Such clips 17' could be spaced apart at a fixed distance (for example, fixed to a solid spacer) or at an adjustable distance (for example, fixed to an adjustable length spacer). Clips 17' can be spring biased clips or clips with slots into which the top edges of the side of the flexible cutting board are received.

In a method that is an alternative to manually holding the flexible cutting board in a curved configuration, the present invention further provides a cutting board that is used in combination with a cutting board holder that secures the flexible cutting board in a curved configuration. This embodiment is further described in reference to FIGS. 6-8.

Figure 6:
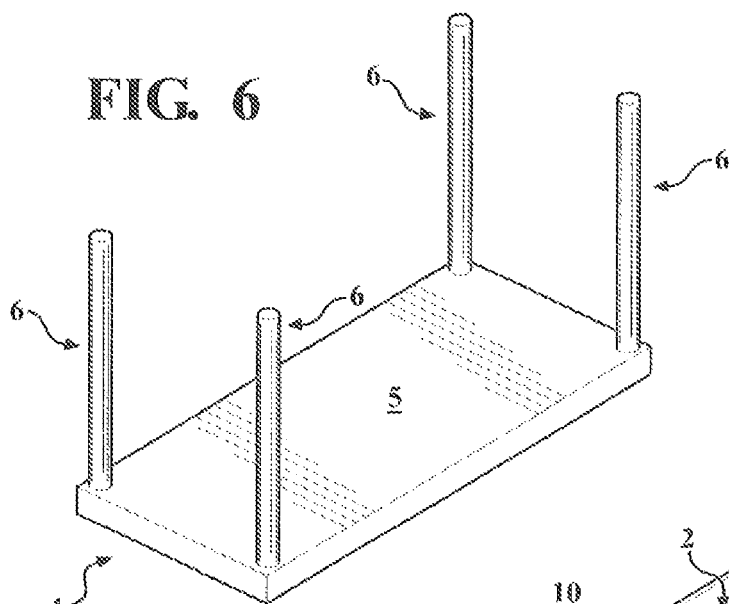
FIG. 6 is a perspective view of a cutting board holder according to one embodiment of the present invention.

FIG. 6 is a perspective view of a cutting board holder according to one embodiment of the present invention. In order to hold the flexible cutting board 1 of the present invention in a curved configuration for chopping and/or cutting food items, the sides 2 and 3 of the flexible cutting board need to be held in an upright or upward configuration as described in reference to FIGS. 2-5 above. In addition, the bottom of the flexible cutting board (when in the curved configuration) needs to be supported on a solid surface so that a knife can strike solidly on food items to be chopped and/or cut.

In the embodiment of the cutting board holder shown in FIG. 6, the cutting board holder 4 includes a base 5 from which four posts 6 that extend upward from the base 5. In the embodiment shown the base 5 has a rectangular shape and the four posts 6 are located at or near the corners of the base 5. In other embodiments the posts could be located inwardly from the ends of the base and not strictly at the corners of the base 5. Also, in further embodiments more than four posts could be used, and or upstanding side wall portions could be used that extend along part(s) or the entire length of sides of the base 5. The posts 6 can have circular, rectangular, square, or any desirable cross-sectional shapes, including relatively flat cross-sectional shapes.

Figure 7:
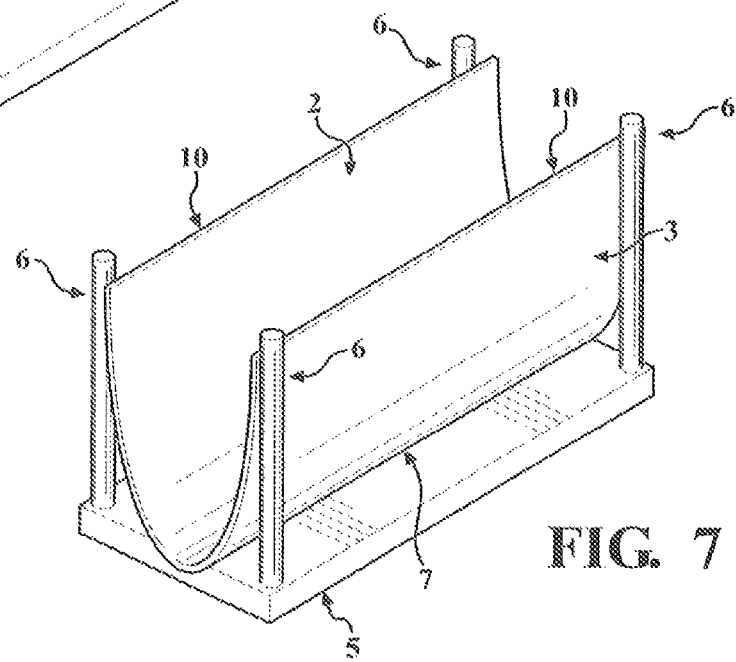
FIG. 7 is a perspective view of a cutting board held in a curved configuration by a cutting board holder according to one embodiment of the present invention.
Figure 8:
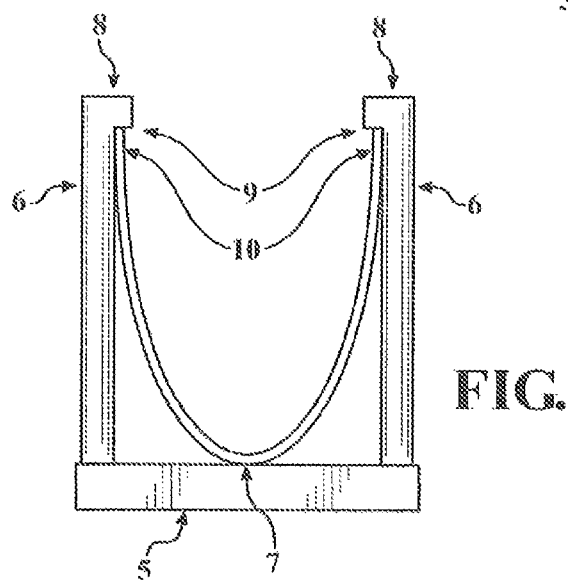
FIG. 8 is an end view of the cutting board and cutting board combination of FIG. 7.

FIG. 7 is a perspective view of a flexible cutting board held in a curved configuration by a cutting board holder according to one embodiment of the present invention. FIG. 8 is an end view of the flexible cutting board and cutting board holder combination of FIG. 7.

As can be seen in FIGS. 7 and 8, the cutting board holder 4 is configured to receive and hold a flexible cutting board 1 in a curved configuration similar to that shown and discussed above in reference to FIGS. 2-5. The bottom 7 of the curved or U-shaped flexible cutting board 1 rests on upper surface of the base 5 and the upward extending posts 6 are positioned along the outside of the curved or U-shaped flexible cutting board 1. As shown, opposed pair members of the upward extending posts 6 can be aligned or substantially or sufficiently aligned with one another on opposite sides of the curved or U-shaped flexible cutting board 1 to support the flexible cutting board 1 in its curved configuration and to resist forces that tend to cause the flexible cutting board 1 to return to a flat configuration. As noted above, in other embodiments more than four posts could be used, and or upstanding side wall portions that extend along part(s) or the entire sides of the base 5 and along the outside of the curved or U-shaped flexible cutting board 1. It is preferred that the base 5 of cutting board holder 4 extends along the length of the area where a user will be chopping and/or cutting food items on a flexible cutting board 1 held in the cutting board holder 4. This area is generally along the middle of the cutting board holder 4 and can extend towards the end where a user inserts and chops and/or cuts with a knife. The base 5 of the cutting board holder 4 can extend beyond the length of a flexible cutting board 1 inserted within the cutting board holder 4 if desired. In such a configuration the upward extending posts 6 may be located inwardly of the ends of the base 5 that extend beyond a flexible cutting board inserted within the cutting board holder 4.

As discuss in reference to FIG. 3 above, in the same manner the U-shaped configuration of the cutting board is not strictly limited to the exact shape illustrated in FIG. 8. As can be understood from the description herein the curved configuration of the cutting board can form a narrower or wider U-shaped configuration than illustrated in FIG. 8. Further the U-shaped configuration does not have to be symmetrical.

The tops of the upward extending post 6 can be configured to engage the top edge of a flexible cutting board 1 inserted and held by the cutting board holder 4. For example, the tops of the upward extending posts 6 can have inwardly projecting portions 8 that provide overhanging structures 9 under which the top edges 10 of a flexible cutting board 1 can engage when the flexible cutting board 1 is inserted into the cutting board holder 4. Such engagement will secure the flexible cutting board 1 in the cutting board holder 4 in a manner that will allow easy release by merely pushing the top edges 10 of the flexible cutting board 1 inwardly so as to clear the overhanging structures 9. Here is it noted that the distance between the heights of any engaging structures provided on the posts 6 relative to the base 5 of the cutting board holder 4 and between the width of such engaging structures on opposite sides of the cutting board holder 4 will determine what width a flexible cutting board 1 should have to be inserted into the cutting board holder 4 and engaged by such engagement structures so that the bottom 7 of the curved or U-shaped flexible cutting board 1 rests on the base 5 of the cutting board holder 4. In a similar manner the width of a flexible cutting board 1 will determine the distance between the heights of any engaging structures on the posts 6 relative to the base 5 of the cutting board holder 4 and the distance between the width of such engaging structures on opposite sides of the cutting board holder 4 that is needed so that when the flexible cutting board 1 is inserted into the cutting board holder 4 and engaged by such engaging structures, the bottom 7 of the curved or U-shaped flexible cutting board 1 rests on the base 5 of the cutting board holder 4. According to one tested embodiment designed for a flexible cutting board having a rectangular shape of 13×15 inches, posts were spaced apart on opposite sides of the base at approximately 3.5 inches and the posts were 7 inches tall with tops that were about 5 inches above the upper edges of the supported flexible cutting board. The base was 15 inches long to match the length of the flexible cutting board. In this tested embodiment two posts were provided on each side and spaced inwardly from respective ends of the base by 4.5 inches. These general dimensions and their ratios can be used and scaled up and adjusted as desired for further embodiments.

Other non-limiting examples of engaging structures that can be provided at or near the tops of the upward extending posts include angled notches formed in the posts, pins that can be fixed or inserted into one or more openings near the tops of the posts, crosspieces that could be coupled or attached to the tops of posts on opposite sides of the cutting board holder, clips that could be attached to or near the tops of the posts, etc. Engaging structures such as clips could be used that clip onto the posts tightly enough to withstand unintentional sliding up or down on the posts or otherwise can be tightened at a desired height on the posts. As noted herein, use of engagement structures are optional and can be used if it is desired to engageably secure a flexible cutting board in the cutting board holders of the present invention.

According to one embodiment of the present invention the edges of the flexible cutting board 1 that would become the top edges 10 when inserted and held by the cutting board holder 4 can be configured to be thicker than the remaining portions of the flexible cutting board 1 so as to provide a stiffer, more rigid edge for purposes of engagement in the cutting board holder 4.

The cutting board holder 4 is preferably made from a material that can be easily cleaned and even washed in a dishwasher if desired. Suitable materials for this consideration include plastic materials. Otherwise the cutting board holder 4 can be made from metal or wood or any suitable sturdy material.

While the base 5 of the cutting board holder 5 is depicted as being in the form or a rectangle in FIGS. 6-8, according to other embodiments, the base can be in the form of a frame having an open center and side and end rails.

Figure 9:
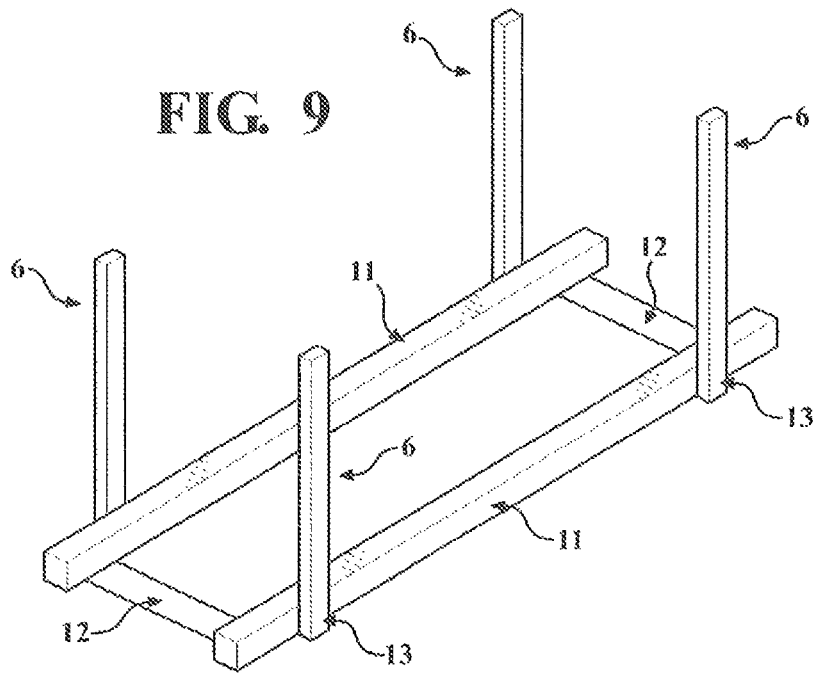
FIG. 9 is a perspective view of a cutting board holder according to another embodiment of the present invention.

FIG. 9 is a perspective view of a cutting board holder according to another embodiment of the present invention. The cutting board holder 4 shown in FIG. 9 has a base 5 that is in the form of a frame that has side rails 11 that are connected at opposite ends by end rails 12. The base 5 has four posts 6 that are located inwardly of the end rails 12. The base 5 is configured to have an open center area so that when a flexible cutting board 1 is inserted into the cutting board holder 4 and secured in a U-shaped configuration by having the top edges of the flexible cutting board engaged by engagement structures at the tops of the posts 6 (if engagement is desired), the bottom of the U-shaped flexible cutting board rests on a surface that is exposed through the open center area of the base 5. The end rails 12 can be relatively flat (e.g. have a relatively flat profile) if desired or otherwise similar to the size of the side rails 11.

The posts 6 of the cutting board holder 4 are depicted as having pivot points 13 about which they can pivot with respect to the side rails 11. The pivot points 13 could be defined by rotatable rods or shafts that extend through the bottoms of the posts 6 and side rails 11, and in the embodiment of FIG. 6 pivotable posts 6 could be incorporated with rotatable rods or shafts that extend through base 5 and connect to the bottoms of posts 6 on opposite sides of the base 5. Other pivotal arrangements can also be incorporated and used. According to some embodiments of the present invention the posts 6 of the cutting board holder 4 are attached or coupled to the base 5 of the cutting board holder 4 in a manner that allows the posts 6 to pivot so that the cutting board holder 4 can be "folded up" and develop a more compact profile that provides for easy storage because the "folded" cutting board holder requires less space for storage than in the case that the posts 6 are not pivotable or retractable or removable. In further embodiments, the posts can be configured to pivot into and out from the base rather that from the outer sides of the base.

In the embodiment shown in FIG. 9 the posts 6 can pivot downward so as to be immediately adjacent to the side rails 11 and develop a smaller profile for purposes or requiring a smaller storage space for the cutting board holder. As can be understood, the posts 6, while shown being pivotally attached on the outside of the side rails 11, could also, in other embodiments the posts can be pivotally attached to the tops or inside surfaces of the side rails 11.

The pivotal posts 6 could be provided with mechanisms that secure or limit their movement in their upright positions if desired. For example blocks or catches could be provided on the side rails 11 (or sides of base 5) that limit the pivoting to between the upright and folded positions. In other embodiments spring catches could be provided at the pivotal connections that engage in set upright and folded positions and require a user to pull the pivotal posts 6 slightly outward (or push spring catch releases slightly inward) to release from such engagements or otherwise pivotally force the pivotal posts 6 out of such engagement. Detent mechanisms could be incorporated to provide for such reversibly engageable pivotal embodiments.

It is to be understood that the pivotal posts 6 discussed in reference to the embodiment of the invention shown in FIG. 9, could also be used in conjunction with a flexible cutting board holder 4 similar to that shown in FIGS. 6-8 in which case the posts 6 would be pivotally attached to the sides of the base 5 or on the top along the sides of the base 5.

Figure 10:
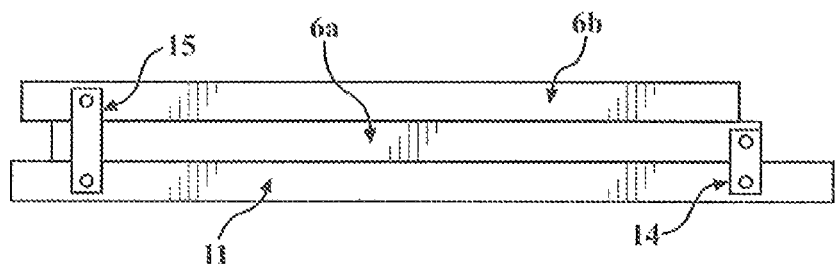
FIG. 10 is partial side view of an embodiment of the present invention that provides an alternative manner of folding the upright posts into a storage position.

FIG. 10 is partial side view of an embodiment of the present invention that provides an alternative manner of folding the posts 6 against the sides of side rails 11 of a flexible cutting board holder or to the sides of a solid rectangular base 5 of a flexible cutting board holder. In FIG. 10 the posts 6 are configured to pivot or fold from an upright position toward one another and upon one another. In the illustrated arrangement each post 6 is pivotally coupled to the side rail 11 (or side or side edges of a solid rectangular base 5) by a bracket 14, 15 that allows one post 6a to pivot downward and rest flat on the side rail 11 (or side or side edges of a solid rectangular base 5) and allows the other post 6b to pivot downward and rest flat on the previously pivoted post 6a.

As can be appreciated, embodiments of the invention discussed in reference to FIGS. 9 and 10 are only non-limited examples of how to provide flexible cutting board holders that can be folded up to reduce the storage space required to store them in, for example, a kitchen cabinet or drawer.

In other embodiments that provide for reduced storage space the posts 6 could be removable received in bores provide in the base 5 (or side rails 11). For example, the bottoms of the posts 6 could be provided with external threads and the bores could be provided with complementary internal threads into which the post could be screwed. In other embodiments bayonet or other releasable engaging structures could be provided on the bottoms of the posts and in the bores to removably receive the posts.

Figure 11:
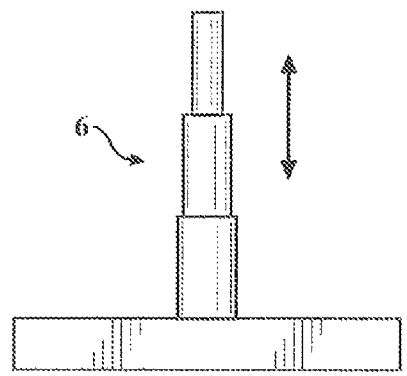
FIG. 11 is a partial side view of an embodiment of the present invention that provides for height adjustment of the posts.

FIG. 11 is a partial side view of an embodiment of the present invention that provides for height adjustment of the posts that hold and secure a flexible cutting board in a desired U-shaped configuration. The post 6 depicted in FIG. 11 comprises a number of telescoping sections that allow for height adjustment of the post. When engagement structures, as discussed above are provided at or near the tops of such height adjustable posts a user can adjust the heights of the posts and make sure the bottom of a U-shaped flexible cutting board held in the flexible cutting board holder and secured by such engagement structures rests on the underlying base or counter top for purposes of chopping or cutting food items.

The telescoping posts can be secured in a desired height using various locking arrangements that a conventionally used in telescopic posts and poles. It is also possible to only provide a portion of the posts with a height adjustment telescopic section, rather than the entire length of the posts.

In further embodiments engagement structures that are provided on the posts for engaging the top edges of a flexible cutting board position in and held by the flexible cutting board holder can be height adjustable. For example, engagement structures that are designed to protrude inwardly can be configured with pins or posts which can be secured into corresponding holes or bores provided at different levels near the tops of the posts. In other embodiments the engaging structures could be configured to be attached to the posts by structures that slide over the posts and can be tightened against the posts or locked or caught or clipped at desired heights.

Figure 12:
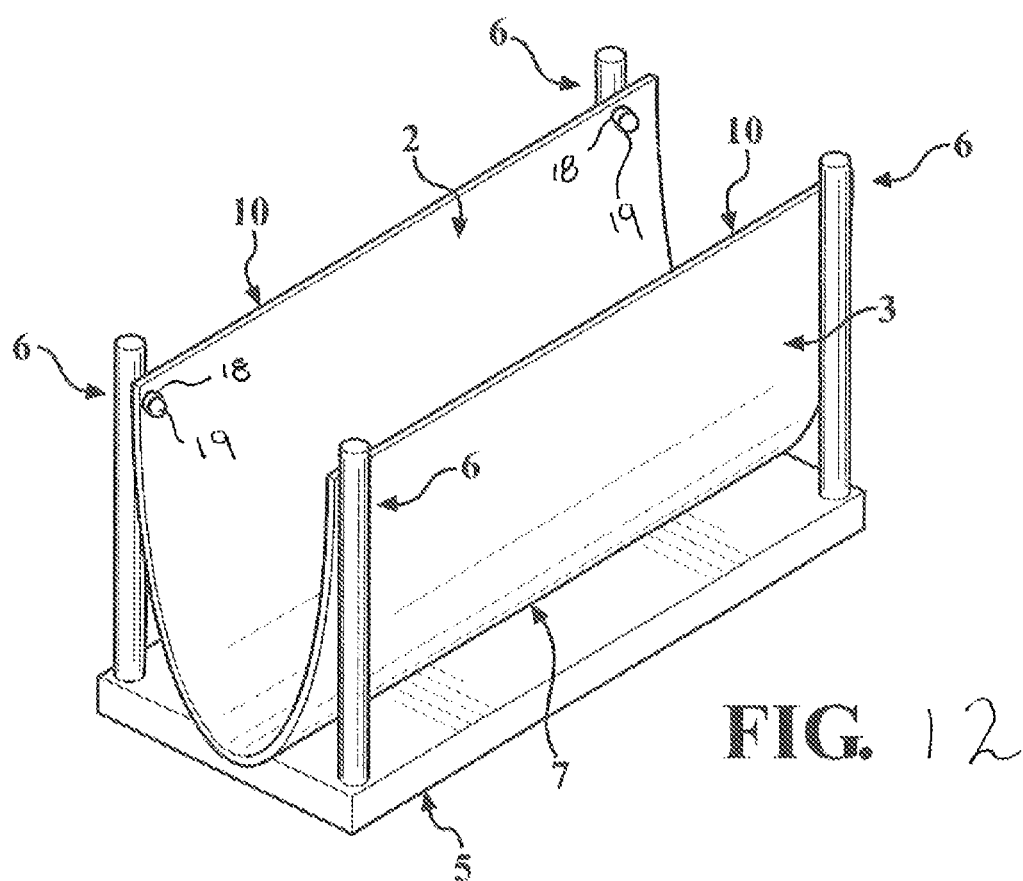
FIG. 12 is a perspective view of a cutting board held in a curved configuration by a cutting board holder according to another embodiment of the present invention.
Figure 13:
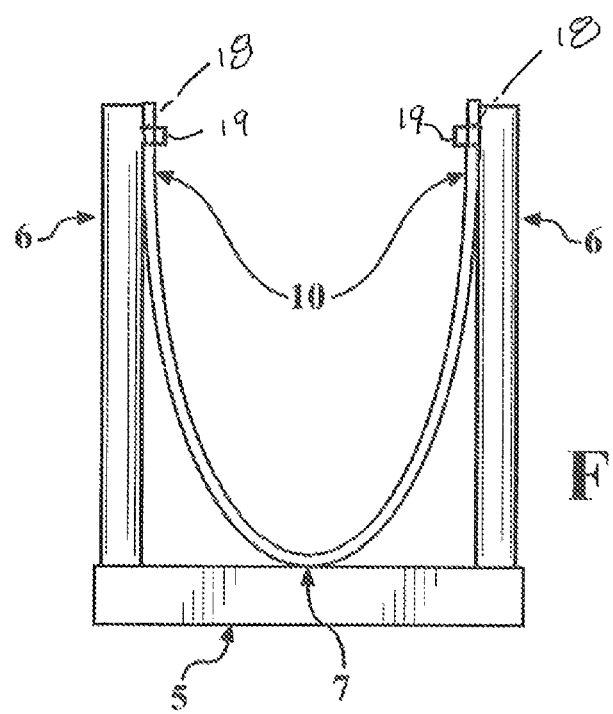
FIG. 13 is an end view of the cutting board and cutting board combination of FIG. 12.

FIG. 12 is a perspective view of a cutting board held in a curved configuration by a cutting board holder according to another embodiment of the present invention. FIG. 13 is an end view of the cutting board and cutting board holder combination of FIG. 12.

In the embodiment of the invention shown in FIGS. 12 and 13, the flexible cutting board 1 has through-holes 18 that are provided to be aligned with and receive inwardly projecting engaging structures 19 that are provided near the tops of the posts 6 of the cutting board holder. In this embodiment, the flexible cutting board 1 has a design configuration (i.e., includes through-holes 18) that cooperates with the engaging structures 19 near the tops of the posts 6. In a similar manner, rather than through-holes 18 the cutting board 1 shown in FIGS. 12 and 13 (and FIG. 8) could be provided with notched-out areas along the opposite sides of the cutting board 1 that could be manipulated to engage the engaging structures 19. The engaging structures can have any convenient shape such as a circular peg that extends inwardly from the posts 6 near the tops of the posts 6 or inwardly extending projections having any cross-sectional shape and the sides of the flexible cutting board 1 can be provided with compatible shaped through-holes or notched-out areas that are configured to receive the engaging structures when the flexible cutting board is held by the posts 6 of the cutting board holder. According to one embodiment the posts along one side of the cutting board holder can be provided with overhanging structures similar to those show in FIG. 8 and the posts along the opposite side of the cutting board holder can be provided with the engaging structures 19. A flexible cutting board can be positioned in the cutting board holder so that one side abuts against the overhanging structures (in notched areas along the side of the flexible cutting board if desired) and then the engaging structures on the posts on the other side of the cutting board holder can pass through through-holes or notches provided on the other side of the flexible cutting board. Alternatively, as discussed above, all the posts can be provided with engaging structures 19 and both sides of the cutting board can be provided with through-holes or notches for engagement with each of the engagement structures. In other embodiments the engagement structures could be in the shape of hooks that can hook into through-holes provided along one or both sides of the flexible cutting board.

In use, a user drops a flexible cutting board downward between the upward posts of the cutting board holder and, if desired, engages the opposite top edges or through-holes or notches with the engagement structures discussed above. At this point the user can adjust or could have adjusted the height of the posts or engagement structures as desired in the case of using a flexible cutting board holder provided with such adjustments. Then the user places a desired amount of food items to be chopped and/or cut onto the bottom of the curved or U-shaped flexible cutting board. Next the user inserts a knife into one end of the curved or U-shaped cutting board between the side walls of the curved or U-shaped flexible cutting board and begins chopping and/or cutting the food item. As the user chops and/or cuts the food item, chopped/cut particles are contained within the curved or U-shaped flexible cutting board and particles to be chopped and/or cut fall down into the bottom of the curved or U-shaped cutting board.

After the chopping/cutting process is complete, the used can release the top edges of the cutting board from the engaging structures (if used) and hold the flexible cutting board in the same or tighter curved configuration to function as a chute to pour the chopped/cut food item(s) into a container. When removed from the cutting board holder and not used in a curved configuration, the flexible cutting board could also be used in a conventional flat configuration.

In further embodiments of the present invention the upright posts do not have to be straight. Alternatively the posts could have a curved shape, including a curved shape that is at least partially complementary to the desired U-shaped configuration of a flexible cutting board held in the flexible cutting board holder.

In further embodiments that do not require a holder or holder elements that are separate from the cutting board, the cutting board can be in the form a tube having a cross-sectional shape that provides a U-shaped lower portion that can be placed on a support surface for chopped/cutting food and a sufficient height to allow a user to develop a knife chopping force to chop foods. Examples of such tubular cross-sectional shapes include egg-shaped cross-sectional shapes, ellipsoidal cross-sectional shapes and elongated oval cross-sectional shapes with straight, parallel or curved sides. Suitable heights of such tubular shaped cutting boards are about 7 inches or taller. Widths of about 5 inches or wider will allow a user to position their hand inside the tubular cutting boards to chop foods with a knife and wash the tubular cutting boards after use. Tube lengths of about 10 inches or longer would be sufficient. These and other dimensions referred to herein can be adjusted to accommodate an amount of foods to be chopped/cut if desired.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A combination of a bendable cutting board and a cutting board holder comprising:
   a cutting board holder comprising:
      a base and structures that extend upward from the base; and
      engaging structures that project inwardly from tops of the structures that extend upward from the base;
   a bendable cutting board having opposed sides and opposed ends; and
   at least one of through-holes and notches provided along at least one of the opposite sides of the bendable cutting board,
      wherein in a curved configuration the bendable cutting board is bend and positioned in the cutting board holder and the at least one of through-holes and notches receive the engaging structures therein and the cutting board conforms into a U-shaped configuration with side walls that are adjacent the structures that extend upward from the base of the cutting board holder and a bottom of the bendable cutting board rests on the base of the cutting board holder,
      wherein the bendable cutting board is configured to be used in a flat configuration when not used in the curved configuration; and
      wherein food items are configured to be cut on the bendable cutting board in both the curved configuration and the flat configuration.

2. The combination of the bendable cutting board and the cutting board holder according to claim 1, wherein the structures that extend upward from the base comprise a plurality of posts.

3. The combination of the bendable cutting board and the cutting board holder according to claim 1, wherein the one of through-holes or notches are provided along each of the opposite sides of the bendable cutting board.

4. The combination of the bendable cutting board and the cutting board holder according to claim 1, wherein the structures that extend upward from the base are configured to be folded downward.

5. The combination of the bendable cutting board and the cutting board holder according to claim 2, wherein the plurality of posts have adjustable lengths.

6. The combination of the bendable cutting board and the cutting board holder according to claim 2, wherein the plurality of posts are removably attached to the base.

7. The combination of the bendable cutting board and the cutting board holder according to claim 2, wherein the plurality of posts are configured to be folded downward.

8. The combination of the bendable cutting board and the cutting board holder according to claim 7, wherein ones of the plurality of posts is configured to be folded downward onto other ones of the plurality of posts.

9. The combination of the bendable cutting board and the cutting board holder according to claim 2, wherein the plurality of posts have a cross-sectional shape selected from circular, rectangular and square.

10. The combination of the bendable cutting board and the cutting board holder according to claim 2, wherein the base of the cutting board holder includes corners and the plurality of posts are located at the corners.

11. The combination of the bendable cutting board and the cutting board holder according to claim 2 wherein the plurality of posts are located inwardly from ends of the base of the cutting board holder.

12. The combination of the bendable cutting board and the cutting board holder according to claim 1 wherein the base of the cutting board holder has a rectangular shape.

13. The combination of the bendable cutting board and the cutting board holder according to claim 1, wherein the bendable cutting board has a rectangular shape.

* * * * *